United States Patent
Gibb et al.

(10) Patent No.: US 6,225,996 B1
(45) Date of Patent: *May 1, 2001

(54) SYSTEM AND METHOD FOR DISPLAYING A CURRENT VALUE OF A CELL OF A DOCUMENT

(75) Inventors: Gary L. Gibb, Lindon; Thomas D. Freeman, South Jordan, both of UT (US)

(73) Assignee: Corel Corporation, Ottawa (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,572

(22) Filed: Feb. 20, 1998

(51) Int. Cl.[7] .................................................. G06F 3/00
(52) U.S. Cl. ........................ 345/341; 345/973; 707/503
(58) Field of Search ................................ 345/341, 973, 345/123, 357, 346, 354, 352; 707/501, 503

(56) References Cited

U.S. PATENT DOCUMENTS 5,588,105 * 12/1996 Foster et al. .......................... 345/335
5,715,413 * 2/1998 Ishai et al. ............................ 345/347
6,055,548 * 4/2000 Comer et al. ........................ 707/503

OTHER PUBLICATIONS

Screen prints from MicroSoft Excel '97 application (pp. 1–5), 1997.*

* cited by examiner

Primary Examiner—Raymond J. Bayerl
Assistant Examiner—Sy D. Luu
(74) Attorney, Agent, or Firm—Fenwick & West LLP

(57) ABSTRACT

A feature of a software application permitting display of a selected non-active cell on a display screen, when the cell is not currently visible in the on-screen window. The user is therefore able to observe the results of certain operations on the contents of the selected cell without scrolling to the location of the cell.

35 Claims, 9 Drawing Sheets

Sales Figures

FIG. 2 (Prior Art)

| | | Model 45 | Model 65 | Model 85 | Model 130 | Model 200 | Model 550 |
|---|---|---|---|---|---|---|---|
| USA | CA | 5,867 | 7,780 | 6,201 | 6,382 | 4,658 | 4,779 |
| | UT | 9,774 | 4,826 | 1,067 | 5,473 | 1,706 | 2,680 |
| | AZ | 3,596 | 3,236 | 297 | 9,808 | 9,835 | 7,242 |
| | CO | 8,255 | 3,082 | 5,803 | 3,576 | 2,778 | 2,240 |
| | NY | 895 | 2,440 | 8,377 | 893 | 368 | 7,355 |
| | NJ | 1,432 | 4,709 | 4,266 | 8,080 | 8,462 | 2,570 |
| | CT | 227 | 6,736 | 8,766 | 5,535 | 8,036 | 4,134 |
| | FL | 5,826 | 2,068 | 6,977 | 8,630 | 5,049 | 9,449 |
| | AL | 2,320 | 4,885 | 8,050 | 7,796 | 8,039 | 853 |
| | OK | 1,494 | 4,335 | 5,863 | 1,477 | 8,916 | 4,651 |
| | WA | 8,188 | 9,702 | 3,975 | 9,372 | 7,904 | 4,512 |
| | DE | 2,372 | 4,060 | 1,847 | 6,619 | 4,626 | 2,110 |
| | DC | 7,576 | 7,623 | 8,403 | 949 | 3,991 | 232 |
| | PA | 8,192 | 1,546 | 7,446 | 1,169 | 5,453 | 3,986 |
| | GA | 7,195 | 7,636 | 231 | 1,875 | 6,387 | 1,648 |
| | TX | 5,700 | 4,937 | 1,353 | 5,021 | 897 | 3,306 |
| | MO | 9,255 | 3,014 | 1,822 | 9,661 | 9,925 | 892 |
| | AK | 3 | 4,211 | 1,883 | 2,321 | 1,873 | 6,294 |
| | KS | 5,352 | 1,532 | 7,916 | 8,006 | 7,251 | 8,208 |
| | LA | 9,012 | 8,180 | 1,952 | 9,634 | 8,048 | 8,233 |
| | NV | 4,654 | 1,753 | 71 | 695 | 1,037 | 6,089 |
| Canada | BC | 9,359 | 1,921 | 9,246 | 871 | 7,746 | 8,621 |
| | AB | 5,321 | 3,783 | 4,325 | 3,275 | 3,571 | 5,396 |
| | SK | 401 | 9,638 | 5,887 | 6,859 | 8,252 | 6,305 |
| | MB | 6,197 | 7,111 | 1,846 | 4,104 | 4,880 | 5,583 |
| | ON | 8,205 | 1,770 | 1,408 | 5,858 | 7,598 | 188 |
| | PQ | 8,808 | 5,109 | 3,669 | 5,812 | 2,128 | 7,326 |
| | NS | 3,192 | 6,949 | 5,984 | 7,114 | 7,444 | 7,739 |
| | NB | 9,471 | 9,803 | 8,166 | 6,493 | 5,165 | 7,878 |
| Total | | 158,139 | 144,375 | 133,100 | 153,328 | 162,023 | 140,499 |

Grand Total: 891,464

FIG. 6

SYSTEM AND METHOD FOR DISPLAYING A CURRENT VALUE OF A CELL OF A DOCUMENT

BACKGROUND OF THE INVENTION

1. Field of the Invention

The present invention relates generally to software applications such as spreadsheets, and more particularly to a system and method of displaying a current value for the contents of a cell of a document, when the portion of the document containing the cell is not currently visible.

2. Description of Background Art

In many software applications, on-screen "windows" are employed to display documents or files. It is well known in the art to provide scrollable windows which are capable of displaying selected portions of such documents or files in response to user specification of scroll commands and resize commands. The user may click on on-screen buttons, or may use keyboard commands, to specify resizing and scrolling operations in various directions and thereby navigate within a document. In this manner, documents containing large amounts of information exceeding the display area of the screen may easily be viewed and edited.

Though such on-screen windows are very useful in facilitating visually intuitive navigation within a document, there are limitations inherent in such a scheme. In particular, the displayed portion of a document, specified by the size and position of the window in a larger "virtual" space comprising the entire document, is generally limited to a single contiguous rectangular region. Thus, for example, in a spreadsheet application containing a plurality of cells, the user may specify a size and position of an on-screen window and thereby obtain a view of a particular contiguous rectangular region within a spreadsheet document. However, conventional systems do not permit simultaneous display of a cell that does not belong to the contiguous region so specified.

In many applications, such display of a cell or cells that do not belong to the contiguous region currently being displayed would be very useful. In spreadsheet applications, for example, formulas may be entered in cells, so that a displayed result in a particular cell comprises a value that is dependent upon values entered in other cells. Thus, a user may wish to edit a value in one cell while observing the results of such editing operations on a second cell. When the second cell is located in close proximity to the first cell, it may be possible to view both cells within the same on-screen window. However, when the second cell is not located in close proximity to the first cell, the user cannot normally view both cells simultaneously. Thus, in order to view the results of the edit operation on the first cell, the user must manually scroll to the second cell, bringing it into view. In tasks involving multiple such edits, this manual scrolling operation is laborious and timeconsuming.

Of course, the user may simply enlarge the on-screen window so that it includes the cell being edited as well as the cell being viewed. However, such enlargement is typically limited by the size of the display screen. Large display screens are available, but they may be expensive and impractical, and may still be insufficiently large to display widely-separated cells in a document. Many spreadsheet applications have usable areas (such as 255 columns by 8,192 rows) far exceeding the display space of conventional screens.

Another solution is that the user may open a second window to display a second contiguous region of the document. Many software applications permit the use of multiple, independently scrollable windows for viewing the same document. However, since each such window typically includes its own title bar, scroll bars, and the like, considerable screen space is consumed by opening multiple windows. In addition, the windows may overlap, making operation and navigation difficult and confusing.

Some applications are capable of displaying a window in a split-pane format, wherein two noncontiguous areas of the document may be displayed in the same window. Each pane within the split-pane window can be independently scrollable along one or both axes. Such a technique may be useful for viewing two or more portions of the same document. However, as with the independently scrollable windows described above, considerable screen space may be consumed by the title bars and other overhead associated with the split-pane format. In addition, the split-pane format generally requires display of the entire displayable portion of a particular row or column, and therefore is not well suited to displaying a single cell in one of the panes, while simultaneously displaying a separate region of the document containing multiple rows and columns.

What is required, then, is a system and method of displaying contents of a cell that does not belong to the group of cells currently displayed in an on-screen window, without unduly reducing available screen space.

What is further required is a system and method of accepting user commands specifying which cell contents to display, in a manner that is user-friendly and does not require extensive user manipulation of on-screen controls and/or commands such as scrolling and resizing windows.

SUMMARY OF THE INVENTION

In accordance with the present invention, there is provided a system and method of displaying the contents of a cell regardless of whether the displayed on-screen window includes the cell. In this manner, a user can view contents of a cell simultaneously with the display of another area of the document. This is particularly useful in software applications, such as spreadsheets, where the contents of a first cell may depend upon values entered in other, widely separated cells, so that the user may wish to change values in some cells while viewing the results of such changes in the first cell.

The present invention provides a cell contents display field that is displayed on the screen or other display device. In one embodiment, the display field is located in a status bar and is therefore separate from the on-screen window showing the active document.

A particular cell is selected for display in the display field. The manner of selecting a cell depends upon the type of software application, but may be as simple as dragging the cell to the area of the screen containing the display field, or invoking a command from a menu or from the keyboard.

Once a cell has been selected, the contents of the cell are displayed, regardless of whether the cell is currently displayed in an on-screen window. If the user scrolls the on-screen window so that the cell is no longer visible, the display field nevertheless continues to display the cell contents. If the contents of the cell change, the display field is updated accordingly, to reflect the change. In this manner, the user is able to view the effects on the selected cell of any changes he or she makes to other areas of the document.

In one embodiment, as will be described below, the display field is editable. The user can then make changes to the contents of the selected cell by editing the display field.

Such changes are reflected in the original location of the selected cell as well as in the display field.

BRIEF DESCRIPTION OF THE DRAWINGS

FIG. 2 is an example of a spreadsheet document.

FIG. 6 is an example of a screen display including a display field according to the present invention.

DETAILED DESCRIPTION OF THE PREFERRED EMBODIMENTS

Figure 1:
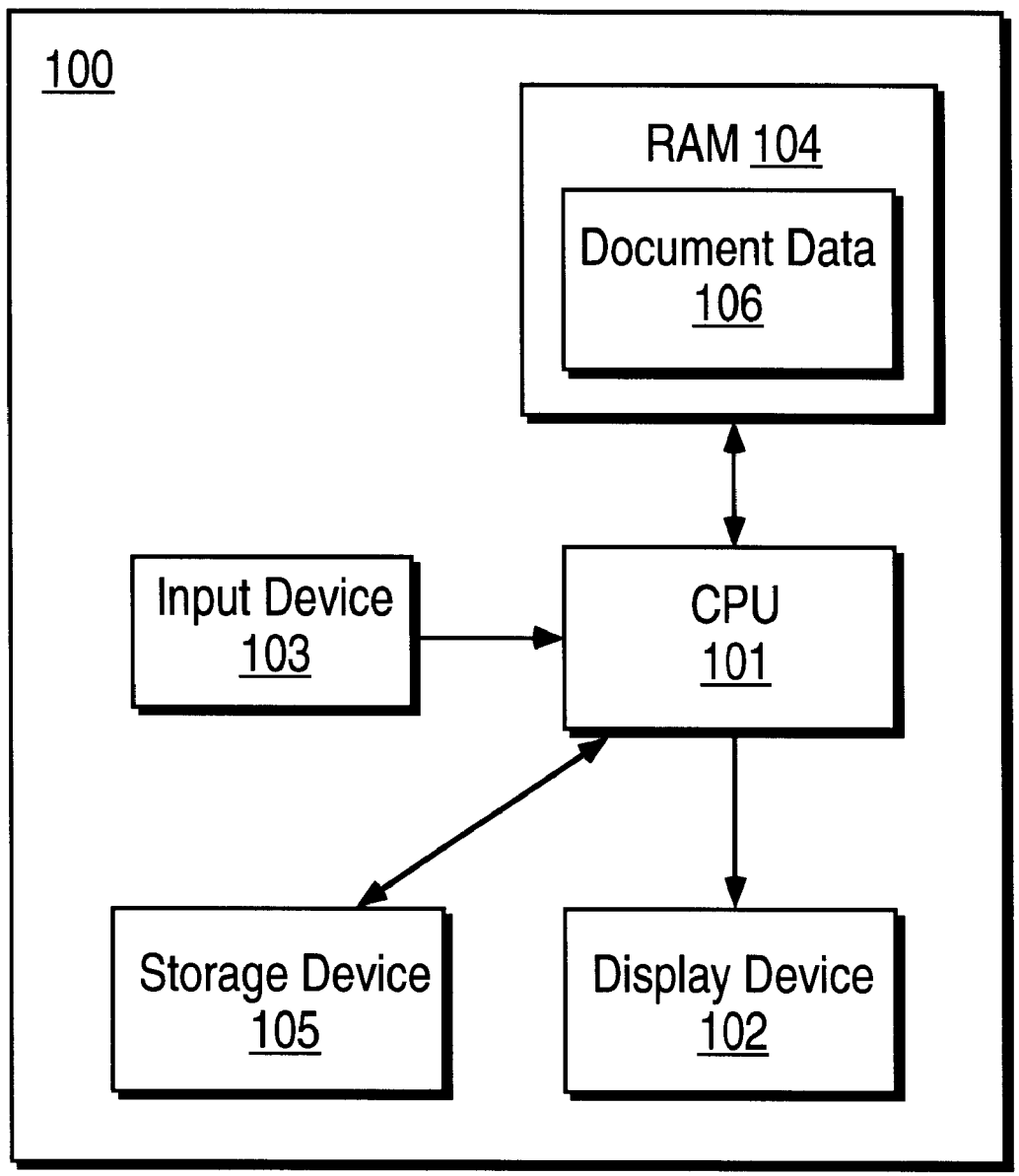
FIG. 1 is a block diagram of a system for practicing the present invention.

Referring now to FIG. 1, there is shown a block diagram for practicing the present invention. In one embodiment, the present invention is implemented on a personal computer running the Microsoft® Windows™ 95 operating system on an Intel® Pentium® processor. The present invention may be implemented as a feature in a software package such as a spreadsheet, database application, or word processor, running on the aforementioned hardware. One skilled in the art will recognize that other embodiments, including other types of software applications, processors, and operating systems, are also possible.

In the block diagram of FIG. 1, computer 100 is shown having a central processing unit (CPU) 101, display device 102, input device 103, random access memory (RAM) 104, and storage device 105. The following detailed description of the invention will make reference to exemplary implementations of such components, though other embodiments may also be used. For example, CPU 101 is a microprocessor such as an Intel Pentium processor; display device 102 is a conventional monitor or screen such as a cathode-ray tube (CRT); input device 103 is one or more of a keyboard, mouse, trackball, or similar device; RAM 104 is some quantity of conventional memory as is commonly supplied with personal computers; and storage device 105 is a hard disk or similar device for long-term storage of programs and data. Some portion of RAM 104 contains data 106 describing the current file that is in use, as will be described in more detail below.

A user runs a software application by loading the software onto computer 100 (from storage device 105) and invoking a command to begin execution. Typically, the software application is then loaded into RAM 104 so that CPU 101 can have access to the program instructions contained therein. On some computer systems, certain portions of the software application may remain on disk 105 to be "swapped into" RAM 104 only as needed, in order to conserve memory space.

One example of such a software application is a spreadsheet application. Such applications are well known in the art, including for example Lotus 1-2-3, Microsoft Excel, and Corel QuattroPro. For illustrative purposes, the remainder of this description will focus on spreadsheet applications, though the present invention can easily be implemented in connection with other types of applications as well. In particular, the present invention may be implemented as part of a table feature in a word processor, or in a database application.

Once the software application has been loaded and is running on computer 100, the user may create or retrieve a document 107 contained in a file stored on storage device 105. Document 107 contains data formatted in such a way that the software application is able to display, process, print, and store document 107 in some meaningful manner. While the user is working on document 107, the data contained therein is stored in memory locations in RAM 104, the contents of which may be manipulated and displayed in accordance with the program instructions of the software application. In some applications, certain portions of the document data may remain on disk 105 to be "swapped into" RAM 104 only as needed, in order to conserve memory space.

Referring now to FIG. 2, there is shown an example of a spreadsheet document 200. The values, arrangement, and formatting shown in this example are stored as data on disk 105 and/or in RAM 104 in a manner that may be interpreted by the software application to generate a printout resembling that of FIG. 2. Thus, each position in the spreadsheet may correspond to a particular memory location in RAM 104, and the contents of that memory location determine the value that will be displayed or printed at that spreadsheet position.

Furthermore, some positions in the spreadsheet may be internally represented not as values, but as formulas that refer to contents of other positions. For example, the sum 201 indicated at the bottom of each column in FIG. 2 is not represented as a fixed value, but is dynamically determined by calculating a sum of all the values in the column above it. If any of the values in the column are changed, the sum is updated accordingly. Similarly, the grand total 202 is represented by adding all the sums 201 to generate a single value. In general, complex interrelationships among cells may be specified by the user, so that a single change can ripple through the entire spreadsheet. This is a valuable feature of spreadsheet applications known in the art, as it facilitates automation of complex calculations and "what if" analyses.

As can be seen from the example of FIG. 2, spreadsheet documents can be quite large. Typically spreadsheet applications permit documents having dimensions of up to 8,192 rows by 255 columns, for a total of over two million cells. Some spreadsheet applications may even exceed this amount. Therefore, in many situations, the size of a spreadsheet document can easily exceed the viewable area of display screen 102. Accordingly, it is well known in the art that resizable scrollable windows may be used to display documents on-screen.

Figure 3:
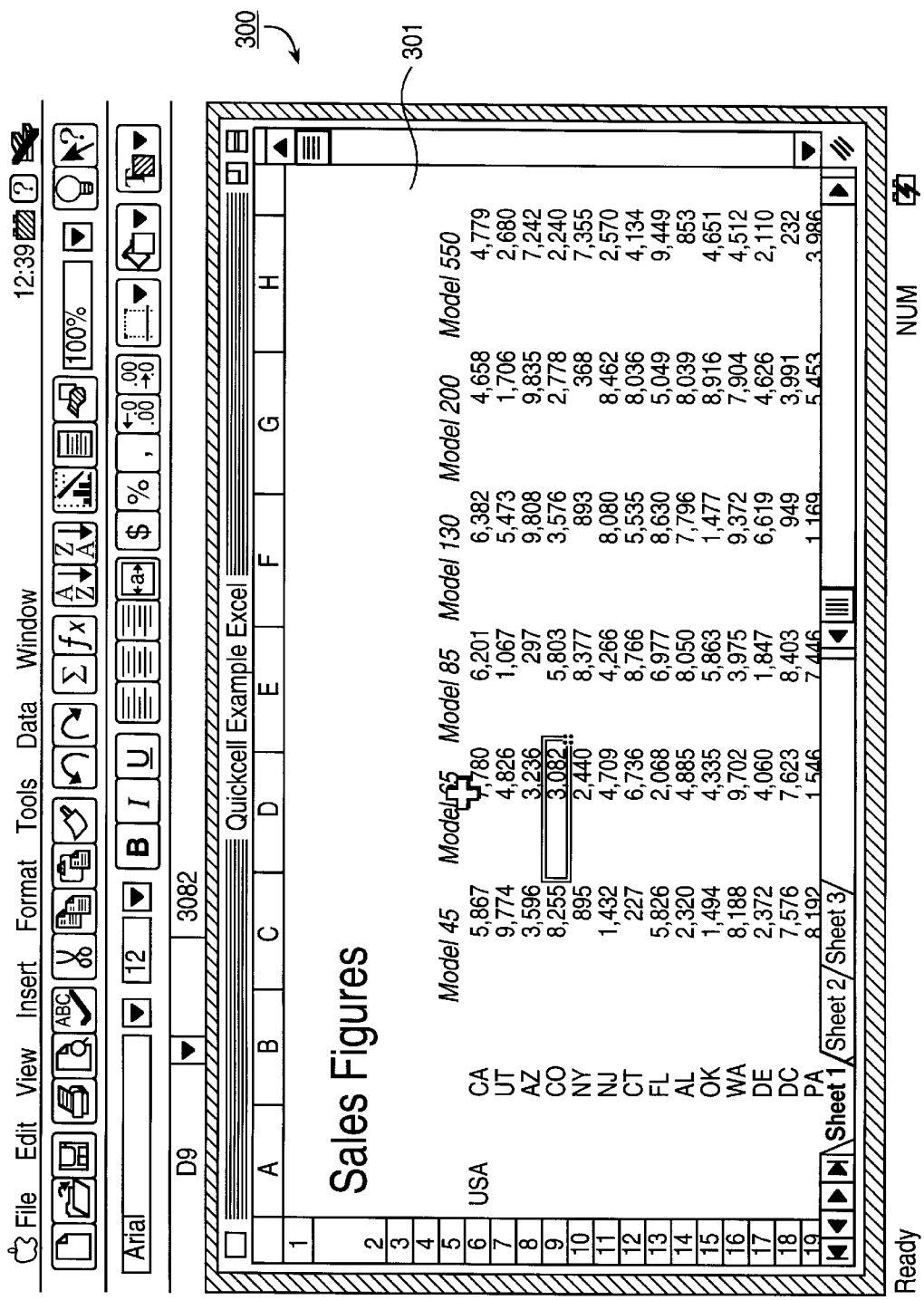
FIG. 3 is an example of a screen display including a scrollable window showing a portion of a spreadsheet document.

Referring now to FIG. 3, there is shown an example of a screen display 300 including a resizable scrollable window 301, according to the prior art. This example and other prior art examples discussed below are screen shots from Microsoft Excel for the Macintosh, version 5.0 (1994). The spreadsheet document shown in window 301 is identical to that of FIG. 2. However, only a portion of the document is visible due to the limited size of window 301. The size of window 301 may be limited by the size of display screen 102, or in some situations the user may choose to reduce the window size further, in order to display multiple windows or to reserve a portion of the screen space for another purpose. Accordingly, it is known in the art to provide graphical on-screen controls for resizing and repositioning window 301. Generally, the user employs a pointing device such as a mouse to move an on-screen cursor to the control, and "drags" the control as appropriate to manipulate window size and position. Additional controls may also be provided for zooming, minimizing, maximizing, and the like. All such operations are well known in the art and are available in connection with the Apple MacOS and Microsoft Windows 95 operating systems.

Given the window size shown in FIG. 3, the size of the spreadsheet in the example, and the formatting shown, it is not possible for a user to simultaneously view all of the values in the spreadsheet document. If the user wishes to make a change, for example, to a value in the top-left corner of the document, he or she will not be able to simultaneously view any effects of such a change on other values in the document. In the example shown, a change to a value in the top-left corner would result in changes to the sum 201 at the bottom of the corresponding column, and in turn a change to the grand total 202 (not shown in FIG. 3). However, neither of the latter two changes would be immediately visible to the user, since the cells containing the column sum 201 and the grand total 202 cannot be seen on the screen at the same time as the cell containing the value changed by the user. Indeed, in order to view the effect of his or her change on the sum 201 and grand total 202 values, the user would have to scroll and/or resize the window accordingly. If the user wishes to make several such changes in succession, in order to try several possible values and perform "what if" analyses, such repeated scrolling back and forth is particularly laborious, time-consuming, and confusing.

Figure 4:
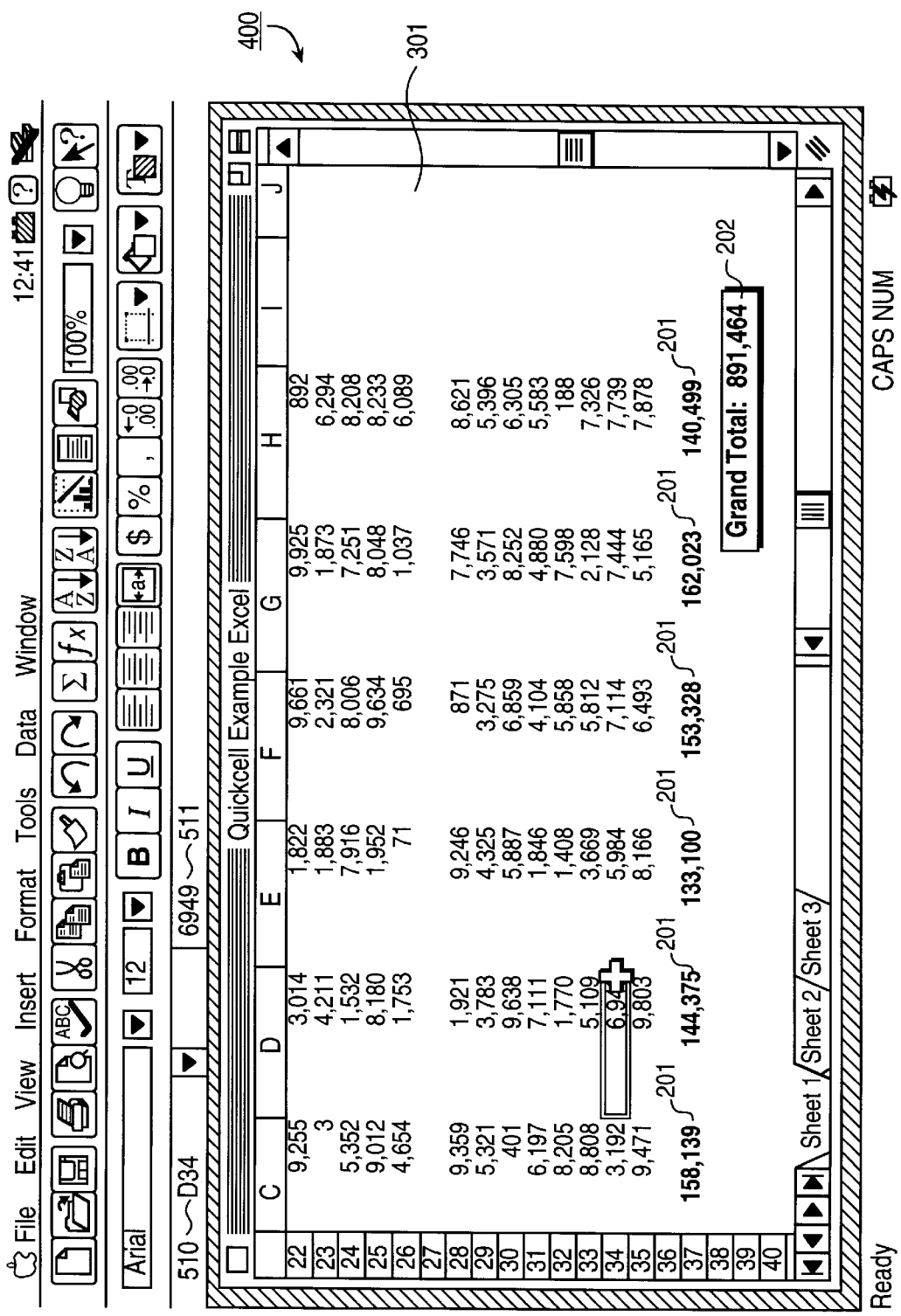
FIG. 4 is an example of a screen display including a scrollable window showing another portion of a spreadsheet document.

Referring now to FIG. 4, there is shown an example of a screen display 400 including resizable scrollable window 301, after the user has scrolled down to reveal sums 201 and grand total 202. The spreadsheet document shown in window 301 is identical to that of FIGS. 2 and 3. It can be seen that the upper area of the document is no longer visible. Since only a single contiguous section of the document is visible at any one time, the user is forced to scroll between two areas of the document in order to view changes to sums 201 and grand total 202 resulting from changes made to values in the upper portion of the document.

Figure 5:
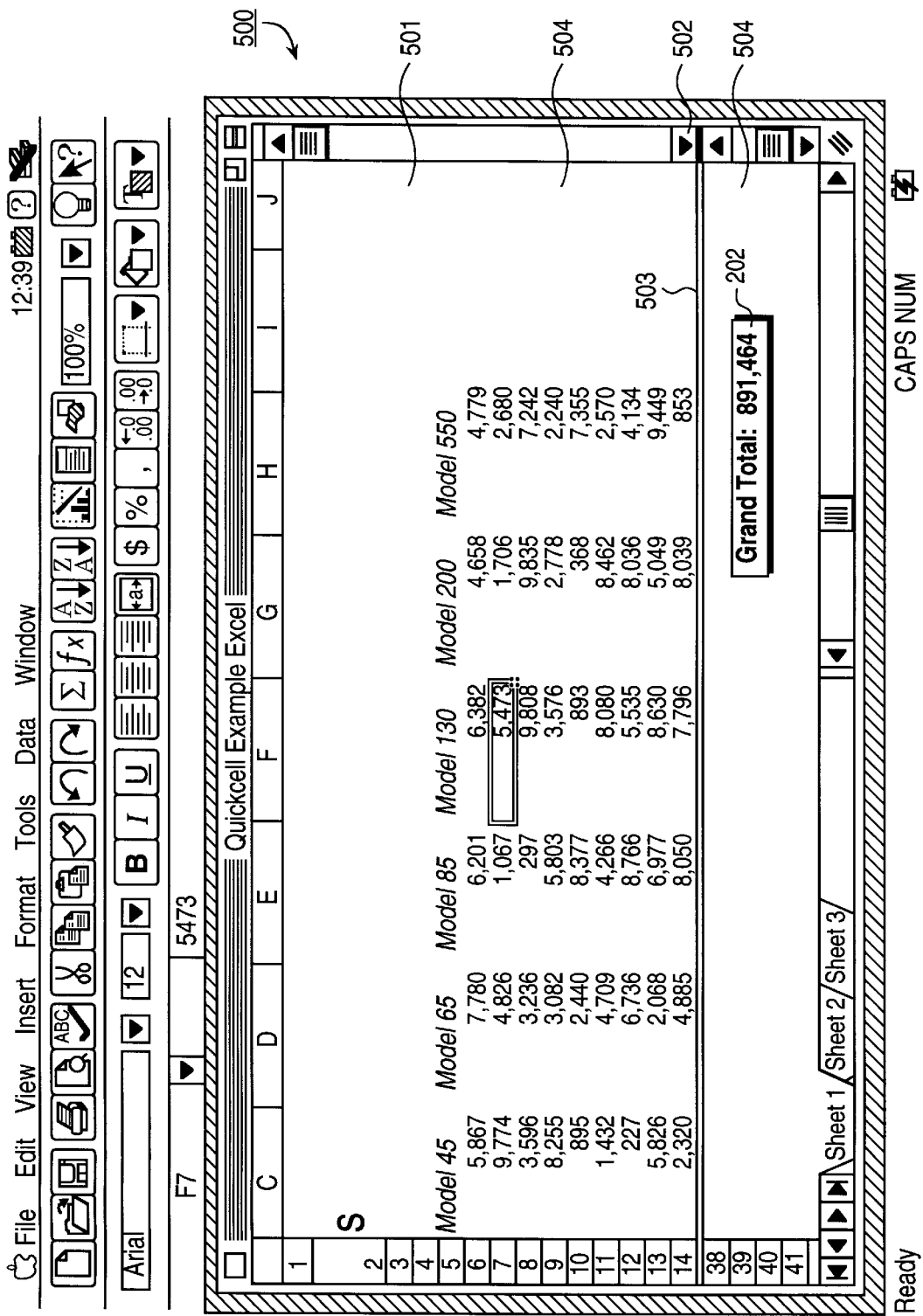
FIG. 5 is an example of a screen display including a split-pane window according to the prior art.

Referring now to FIG. 5, there is shown an example of a screen display 500 including a split-pane window 501 according to the prior art. It is well known in the art of spreadsheet applications and other software applications to provide a mechanism for splitting an on-screen window to allow viewing of two or more areas of a document. The user activates this feature by invoking a command or dragging a split icon 502 to a desired location in window 501. Depending on whether the user has selected horizontal or vertical splitting, a horizontal or vertical split bar 503 appears, dividing window 501 into two panes 504. Each pane 504 is separately scrollable, so that one of the panes 504 can be scrolled to show an area of the document that is noncontiguous with the area shown by the other pane 504.

The technique shown in FIG. 5 facilitates viewing of two separate areas of the document and thereby could be used to view the effect of a change in one cell on the contents of another cell. In the example shown, the user is able to view grand total 202 while making changes to cell contents in other areas of the document.

However, the split-pane scheme is subject to some limitations and is inconvenient in many situations. A horizontal split (as shown in FIG. 5) necessarily involves displaying an entire row segment that stretches across the width of the on-screen window 501. This takes up much more screen space than is necessary, and has the potential to confuse the user. A vertical split involves similar problems in connection with displaying an entire column segment stretching down the length of the on-screen window 501.

In addition, a horizontal split only permits viewing of document regions lying in the same column range. Scrolling to the left or right causes both panes 504 to scroll in unison. This limits the flexibility in displaying disparate areas of the document that do not lie in the same column range. Similarly, a vertical split only permits viewing of document regions lying in the same row range. Scrolling up or down causes both panes 504 to scroll in unison, thus limiting flexibility in displaying disparate areas that do not line in the same row range.

Figure 5A:
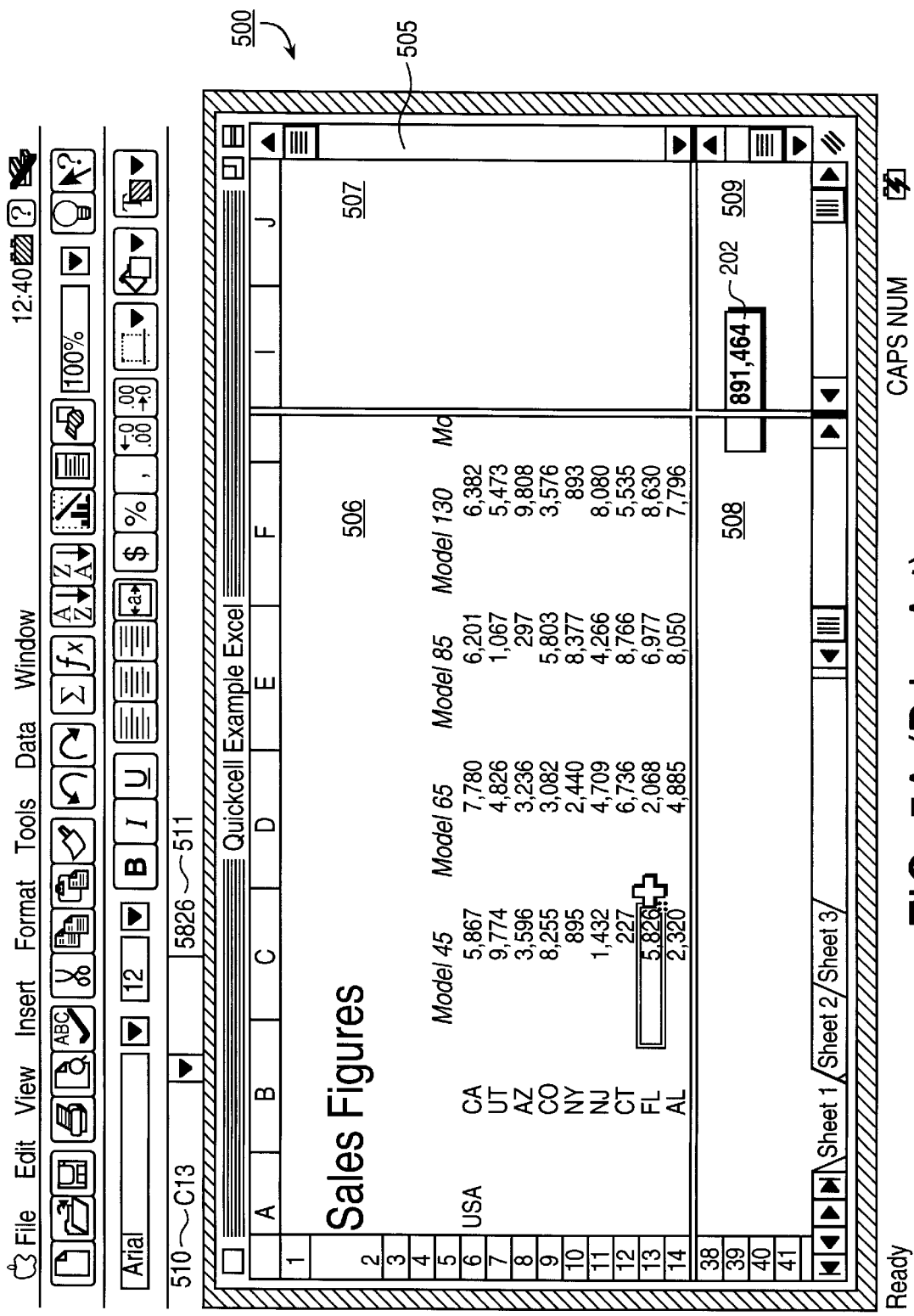
FIG. 5A is an example of a screen display including a four-pane window according to the prior art.

Referring now to FIG. 5A, there is shown an example of a four-pane split. It is possible, according to some prior art software programs, to invoke horizontal and vertical splits simultaneously, thus dividing the window 505 into four panes 506, 507, 508, 509. Two diagonally opposed panes 506, 508 may then be positioned to view disparate document regions without regard to row or column ranges. However, such a technique uses a large amount of extraneous screen space, as the other two panes 507, 509 necessarily display areas of the document that may be of no interest.

In addition, the split-pane technique may be cumbersome to configure and activate, as the user must carefully position and size the panes to display the desired areas. There may be situations where the split pane feature is unavailable or in use for another purpose, thus preventing the user from being able to view noncontiguous areas of a document in an effective and easy fashion.

Figure 7:
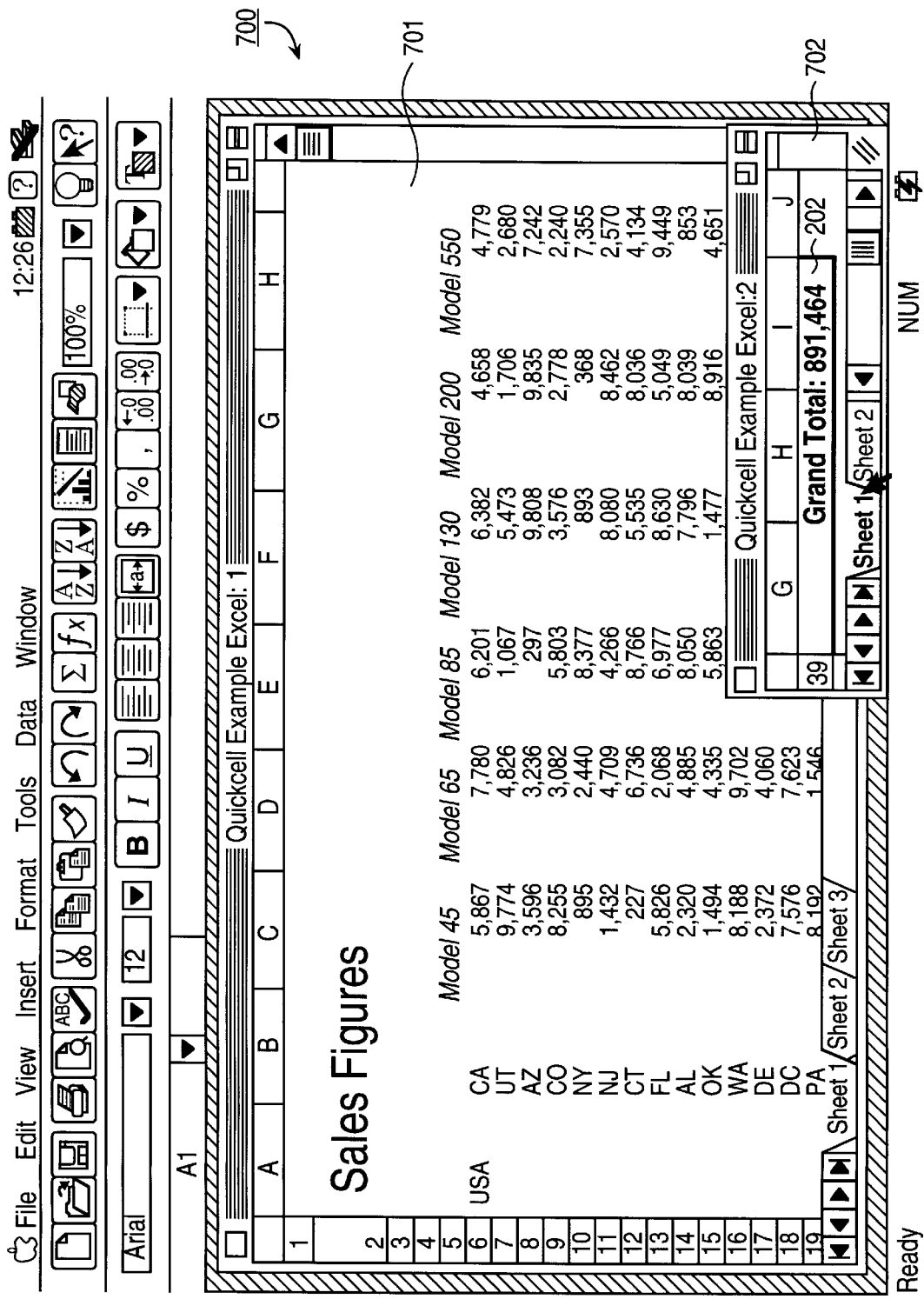
FIG. 7 is an example of a screen display including two scrollable windows for viewing different portions of a spreadsheet document according to the prior art.

Some prior art software programs permit the user to open two windows into the same document. Referring now to FIG. 7, there is an example of a screen display 700 containing two scrollable windows 701, 702 offering views into the same document. Each window 701, 702 is independently scrollable and resizable, allowing the user to view two or more different regions in the document. However, as can be seen in FIG. 7, each window 701, 702 introduces additional overhead in screen space and complexity. In hardware environments where screen space is limited, such a solution may not be feasible. In addition, the technique of FIG. 7 requires the user to carefully resize and position the second window 702 so as to display the desired portion of the screen. When the user wishes to view just one cell, it may not be possible or practicable to resize a window sufficiently small. In addition, as can be seen in FIG. 7, there may be a problem with one window overlapping and partially obscuring another window. Finally, when windows into multiple documents are open, as is known in the art, the user may confuse the multiple windows into a single document with those showing other documents. Since each window is independently manipulated, it may be difficult to activate (bring to the foreground) all windows that relate to a single document, in a single action.

Referring again to FIG. 4, many spreadsheet applications provide an active cell identifier 510 and active cell entry area 511 for identifying and editing the currently active cell in the document. In the example of FIG. 4, the user has indicated cell D34 as the active cell. Thus, active cell identifier 510 shows "D34". The contents of cell D34 are shown in active cell entry area 511 as "6949". Area 511 can be used for editing, deleting, or otherwise manipulating this value.

In prior art spreadsheet applications, it is possible for the on-screen window to the configured so that the active cell is not visible. For example, the user may click on a cell to make it the active cell, and subsequently scroll the on-screen window so that the active cell is no longer visible. The user can still view and edit the contents of the active cell using entry area 511, thus providing limited ability to view contents for a cell that is not currently visible in the on-screen window.

However, entry area 511 always shows the currently active cell. By definition, the active cell is the only cell which the user may edit at any given time. If the user attempts to edit the active cell using entry area 511, prior art spreadsheet applications automatically bring the corresponding cell back into view in the on-screen window. Therefore, the active cell entry area 511 cannot effectively be used for the purpose of editing one cell while simultaneously viewing the results in a distant portion of the spreadsheet.

In addition, the active cell entry area 511 of prior art spreadsheet applications shows formulas rather than resultant values. This is useful for situations where the user wishes to edit a formula, but it does not provide the ability to observe the changes in resultant values of the formula in response to changes to values in other cells.

Figure 6:
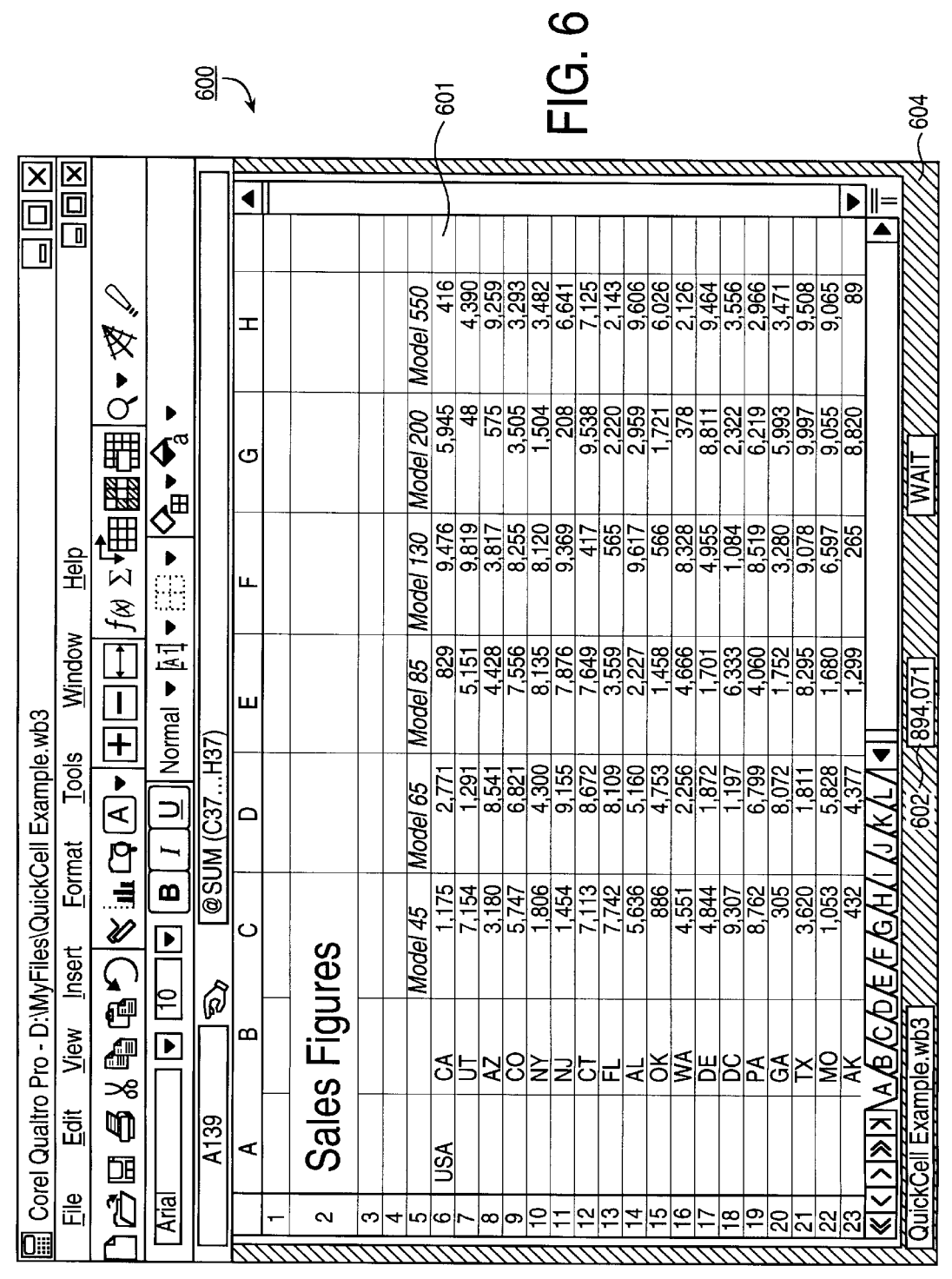

Referring now to FIG. 6, there is shown an example of a screen display 600 including a single scrollable window 601 and a display field 602 according to the present invention. Display field 602 shows the contents of a selected cell in the document, regardless of whether the selected cell is currently visible in window 601, and regardless of whether the selected cell is the currently active cell. If the selected cell contains a formula, field 602 shows the resultant value from calculation of the formula, rather than the formula itself. Thus, display field 602 provides a stable, persistent indicator of the value of the contents of the selected cell, without introducing any of the limitations of the prior art schemes described above.

In one embodiment, the user is able to specify the selected cell by clicking on the cell using input device 103 such as a mouse, and performing a "drag-and-drop" operation to drag the cell onto display field 602. In another embodiment, the user can specify the selected cell by clicking on the cell and invoking a command using an on-screen menu or keyboard stroke. The selected cell remains specified until the software application is closed. The user can change his or her selection by performing the appropriate operation on another cell. The user can also cancel display of a cell in field 602 by invoking another command. In one embodiment, the address of the selected cell is stored in storage device 105 when the document is saved, so that when the user subsequently retrieves the saved document, the state of display field 602 is restored as well.

Display field 602 shows the contents of the selected cell in a dynamic fashion. Whenever the value in the selected cell changes, display field 602 is automatically updated to reflect the change. In one embodiment, display field 602 displays the contents of the selected cell in a format specified by the user. In another embodiment, display field 602 uses a format corresponding to the current format of the selected cell itself. For example, in such an embodiment, if the selected cell is currently formatted in 14-point bold Palatino, display field 602 uses the same font and style. In one embodiment, changes to formatting characteristics of the selected cell are immediately reflected in display field 602. Though these features may be desirable in certain implementations and environments, they are not necessary to practice the invention.

In yet another embodiment, more than one display field 602 may be provided, so that the user can view several selected cells simultaneously.

The selected cells may be adjacent or nonadjacent in the original document, and may be individually selected or changed by the user.

In yet another embodiment, display field 602 is an editable field. The user can click on field 602 and select, delete, or modify the value stored therein. These changes are then reflected in the original location of the selected cell as well, providing a mechanism for the user to quickly and easily make changes to various disparate areas of the spreadsheet document. In one embodiment, if the selected cell contains a formula, the user can edit the formula itself by clicking on display field 602 and entering input via a keyboard.

In one embodiment, as shown in FIG. 6, display field 602 is part of a status bar 604 that contains other useful information pertaining to the current document. Since status bar 604 is a relatively permanent display element, placing display field 602 in status bar 604 provides a non-intrusive, user-accessible location for the user to refer to the selected cell contents, without consuming an excessive amount of screen space.

In one embodiment, if multiple documents are open simultaneously, display field 602 does not change when the user switches focus among documents. In this manner, display field 602 can be used to view a value belonging to a document other than the currently active document. This may be useful when the cell contents of one document are dependent upon values from other documents, and the user wishes to see the effects of his or her changes on the contents of a resultant cell. In another embodiment, display field 602 switches to view different cells depending upon which document is currently active. In yet another embodiment, the user is able to select which of these modes of operation will be used.

Figure 8:
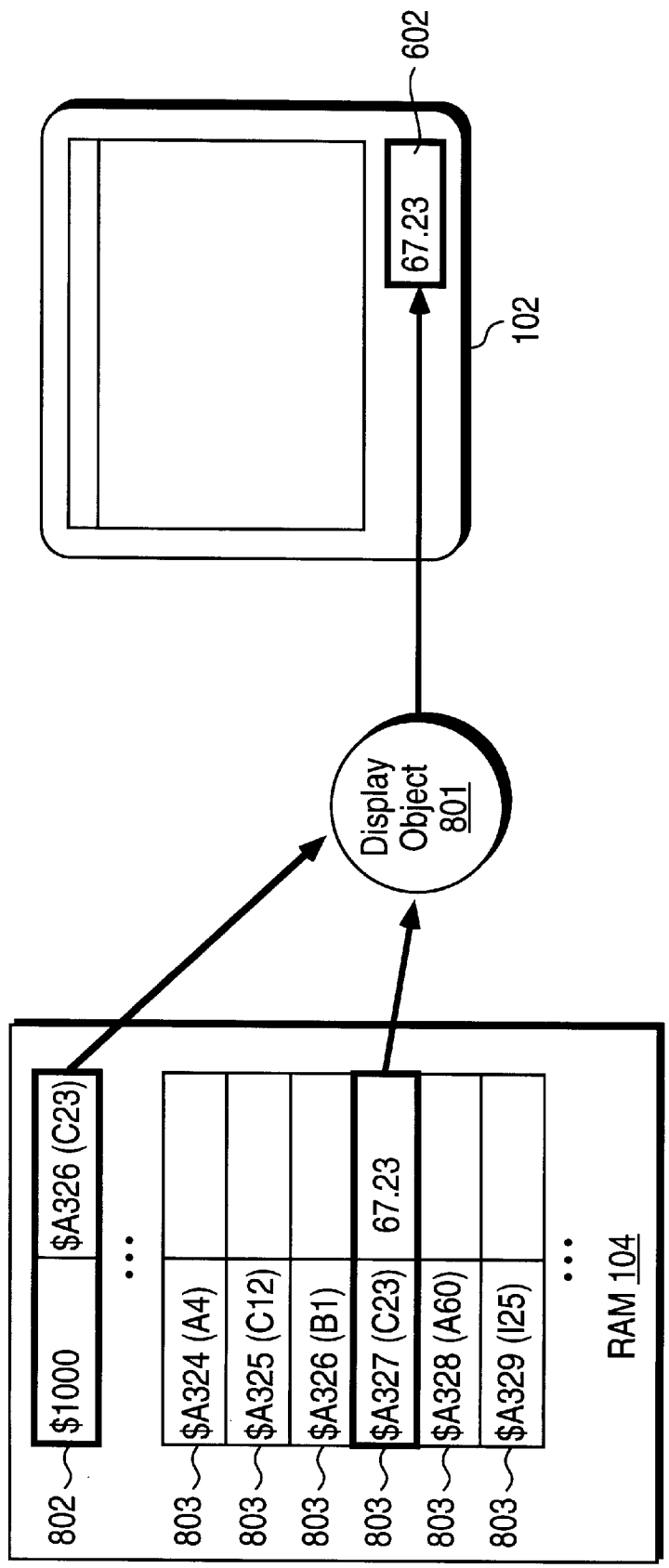
FIG. 8 is a diagram showing operation of the present invention using a display object.

Referring now to FIG. 8, there is shown an implementation of the present invention. In one embodiment, the present invention is implemented using a persistent on-screen display object 801 programmed to display a value in the status bar of the software application. A memory location 802 in RAM 104 specifies which cell in the document is to be displayed by storing therein a memory address corresponding to a cell identifier. In the example, the memory address is $A326, corresponding (by a stored internal table) to cell identifier C23. When the user selects a cell to be displayed in display field 602, the address specifying the selected cell is stored in memory location 802. Display object 801 refers to the specified address in table 803 to retrieve the value that will be displayed. Display object 801 then displays the retrieved value in the specified location on screen 102.

In one embodiment, the state of memory location 802 is stored in storage device 105 when the document is saved, so that the state may be restored when the document is later retrieved. In embodiments including more than one display field 602, a corresponding number of memory locations 802 is provided. In embodiments wherein display field 602 is editable, a write object (not shown) is provided whereby the user's entry into display field 602 is written into the memory location in table 803 specified by the address stored in memory location 802.

From the above description, it will be apparent that the invention disclosed herein provides a novel and advantageous system and method of displaying a current value for the contents of a cell of a document, when the portion of the document containing the cell is not currently visible, and without consuming an excessive amount of screen space. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. In a system including a computer having a memory and a display device, a software application stored in the computer memory and having a plurality of cells capable of storing content representing data stored in the computer memory, the system further comprising:

at least one window associated with the software application, each window displaying on the display device a subset of the plurality of cells; and a cell content display field associated with the software application, the cell content display field displayed on the display device concurrently with and independently of the at least one window, the cell content display field displaying content of a selected cell not currently active and not included in any subset of cells contained in any displayed window.

2. The system of claim 1, wherein the software application is a spreadsheet application.

3. The system of claim 1, wherein the software application is selected from the group consisting of a database application and a word processing application.

4. The system of claim 1, wherein at least one of the windows is scrollable in response to user commands.

5. The system of claim 1, wherein the selected cell is specified in response to a user command.

6. The system of claim 1, wherein the cell content display field is modifiable by a user, and wherein the content of the selected cell is modified in response to user modification of the cell content display field.

7. The system of claim 1, wherein a representation specifying the selected cell is stored in a storage device.

8. The system of claim 1, wherein each cell in the plurality of cells has a specified format, and wherein the cell content display field displays the content of the selected cell in the specified format of the selected cell.

9. The system of claim 1, wherein the cell content display field is located on the display device in a region outside any displayed window.

10. The system of claim 9, wherein the software application includes a status bar, and wherein the cell content display field is located in the status bar.

11. The system of claim 9, wherein the software application comprises a menu bar, and wherein the cell content display field is located in the menu bar.

12. The system of claim 1, wherein the content of the selected cell is a formula, and the cell content display field displays a resultant value determined by applying the formula.

13. In a system including a computer having a memory and a display device, a software application stored in the computer memory and having a plurality of cells capable of storing content representing data stored in the computer memory, the system further comprising:

at least one window associated with the software application, each window displaying on the display device a subset of the plurality of cells; and a cell content display field associated with the software application, the cell content display field displayed concurrently with the at least one window on the display device, the cell content display field displaying content of a selected cell not included in any subset of cells contained in any displayed window;

wherein the selected cell is specified in response to a user command activated by positioning a pointing device on the selected cell and dragging the pointing device to the cell content display field.

14. In a software application having a plurality of cells capable of storing content, a computer-implemented method for displaying content of a cell, comprising:

receiving a selection of a cell;

displaying at least one window, each window containing a subset of the plurality of cells not including the selected cell; and displaying, concurrently with and independently of the display of the at least one window, content of the selected cell when it is not active, in a cell content display field.

15. The method of claim 14, wherein receiving a selection of a cell comprises:

receiving a user command; and selecting the cell in response to the user command.

16. The method of claim 14, further comprising:

receiving user input for the cell content display field; and modifying the content of the selected cell displayed in the cell content display field in response to the user input.

17. The method of claim 14, further comprising:

storing a representation of the selected cell in a storage device.

18. The method of claim 14, wherein each cell in each plurality of cells has a specified format, and wherein displaying the content of the selected cell comprises displaying the content of the selected cell in the specified format of the selected cell.

19. The method of claim 14, wherein displaying the content of the selected cell comprises displaying the content of the selected cell in a cell content display field located in a region outside any displayed window.

20. The method of claim 14, wherein displaying the content of the selected cell comprises displaying the content of the selected cell in a status bar.

21. The method of claim 14, wherein the content of the selected cell is a formula, and wherein displaying the content of the selected cell comprises displaying a resultant value determined by applying the formula.

22. The method of claim 14, wherein displaying the content of the selected cell comprises displaying the content of the selected cell in a menu bar.

23. A computer program product comprising a computer-usable medium having computer-readable code embodied therein for displaying content of a cell in a software application having a plurality of cells capable of storing content, the computer program product comprising:

computer-readable program code configured to cause a computer to receive a selection of a cell;

computer-readable program code configured to cause the computer to display at least one window, each window containing a subset of the plurality of cells not including the selected cell; and computer-readable program code configured to cause the computer to display, concurrently with and independently of the display of the at least one window, content of the selected cell when it is not active, in a cell content display field.

24. The computer program product of claim 23, wherein the computer-readable program code configured to cause the computer to receive a selection of a cell includes:
   computer-readable program code configured to cause the computer to receive a user command; and
   computer-readable program code configured to cause the computer to specify the selected cell in response to the user command.

25. The computer program product of claim 24, wherein the computer-readable program code configured to cause the computer to receive a user command includes:
   computer-readable program code configured to cause the computer to detect positioning of a pointing device on the selected cell and dragging the pointing device to the cell content display field.

26. The computer program product of claim 23, further comprising:
   computer-readable program code configured to cause the computer to receive user input for the cell content display field; and
   computer-readable program code configured to cause the computer to modify the content of the selected cell in response to the user input.

27. The computer program product of claim 23, further comprising:
   computer-readable program code configured to cause the computer to store a representation of the selected cell in a storage device.

28. The computer program product of claim 23, wherein each cell in each plurality of cells has a specified format, and wherein the computer-readable program code configured to cause the computer to display the content of the selected cell includes computer-readable program code configured to cause the computer to display the content of the selected cell in the specified format of the selected cell.

29. The computer program product of claim 23, wherein the computer-readable program code configured to cause the computer to display the content of the selected cell includes computer-readable program code configured to cause the computer to display the content of the selected cell in a cell content display field located in a region outside any displayed window.

30. The computer program product of claim 23, wherein the computer-readable program code configured to cause the computer to display the content of the selected cell includes computer-readable program code configured to cause the computer to display the content of the selected cell in a status bar.

31. The computer program product of claim 23, wherein the computer-readable program code configured to cause the computer to display the content of the selected cell includes computer-readable program code configured to cause the computer to display the content of the selected cell in a menu bar.

32. The computer program product of claim 23, wherein the content of the selected cell is a formula, and wherein the computer-readable program code configured to cause the computer to display the content of the selected cell includes computer-readable program code configured to cause the computer to display a resultant value determined by applying the formula.

33. The computer program product of claim 23, wherein the software application is a spreadsheet application.

34. The computer program product of claim 23, wherein the software application is selected from the group consisting of a database application and a word processing application.

35. The computer program product of claim 23, wherein at least one of the windows is scrollable in response to user commands.

* * * * *